United States Patent

Mangold

[15] 3,674,317
[45] July 4, 1972

[54] HYDRAULIC ANTISKID BRAKING SYSTEM
[72] Inventor: James Mangold, Tremblay-le-Gonesse, France
[73] Assignee: Societe Anonyme D.B.A.
[22] Filed: July 16, 1970
[21] Appl. No.: 55,504

[30] Foreign Application Priority Data
July 31, 1969 France......................6926216

[52] U.S. Cl..................303/21 F, 303/21 AF, 303/22 R
[51] Int. Cl...............................................B60t 8/00
[58] Field of Search.............188/106 P, 181 A, 195, 345, 188/349, 354; 303/6 C, 21 AF, 21 F, 22 R

[56] References Cited

UNITED STATES PATENTS

| | | | |
|---|---|---|---|
| 3,588,191 | 6/1971 | Atkin et al. | 303/21 F |
| 2,869,687 | 1/1959 | Keim et al. | 303/21 F |
| 3,503,655 | 3/1970 | Heimler | 303/21 F |
| 3,556,609 | 1/1971 | MacDuff | 303/21 F |
| 3,004,801 | 10/1961 | Wrigley | 303/21 F |
| 3,466,098 | 9/1969 | Pieren et al. | 303/21 F |
| 3,305,051 | 2/1967 | Maurice | 188/349 X |
| 3,410,608 | 11/1968 | Cadiou | 188/349 X |
| 3,576,350 | 4/1971 | Larsen | 188/181 A X |

Primary Examiner—Milton Buchler
Assistant Examiner—Stephen G. Kunin
Attorney—W. N. Antonis and Plante, Hartz, Smith and Thompson

[57] ABSTRACT

A vehicle antiskid braking system comprising a hydraulic pressure control source adapted to supply two independent braking circuits with two separate hydraulic braking pressures respectively, an antiskid control unit adapted to modulate the first braking pressure to the hydraulic brake actuators of a first set of wheels as a function of the skidding of at least one wheel of said first set, a modulator unit adapted to modulate the second braking pressure to the hydraulic brake actuators of a second set of wheels as a function of the braking pressure in said first set of wheel brake actuators and a normally closed by-pass valve unit to by-pass said modulator unit for directly connecting said control source to said second set of wheel brake actuators, upon a failure in said first braking circuit.

6 Claims, 1 Drawing Figure

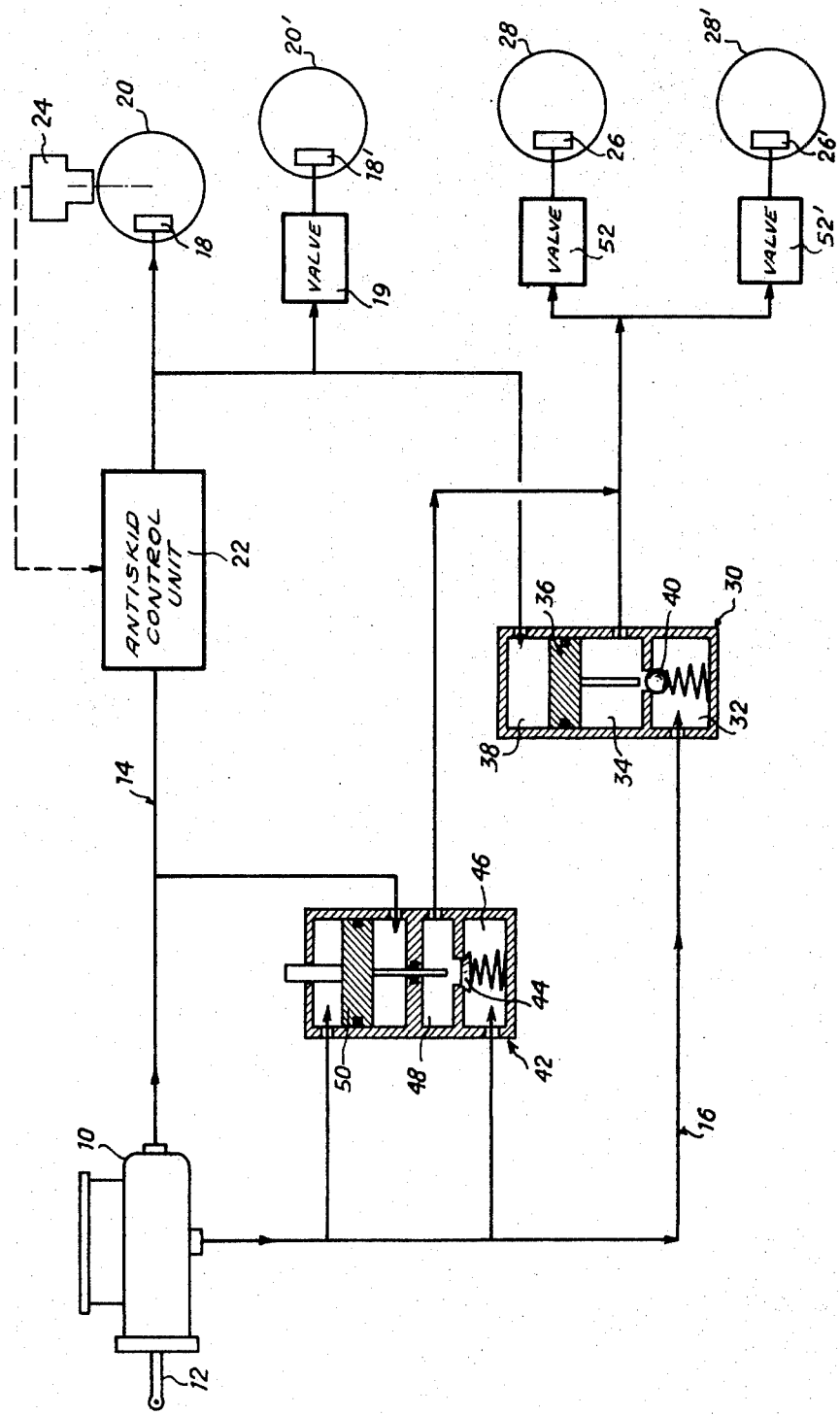

HYDRAULIC ANTISKID BRAKING SYSTEM

This invention relates to a hydraulic antiskid braking system for a vehicle.

It has been already proposed antiskid braking systems wherein only one antiskid control unit, responsive to the skidding of at least one of the wheels relating to a given axle of the vehicle, was provided between the hydraulic braking pressure control source and the various wheel brake actuators of the vehicle to substantially prevent skidding of all the vehicle wheels.

The main object of the invention is to use only one antiskid control unit, of any known suitable type, for preventing the skidding of the wheels of a vehicle provided with a hydraulic braking system of the split type wherein the operator actuated pressure control device is adapted to supply the two independent portions of the braking system with two separate hydraulic braking pressures respectively.

According to the main feature of the invention, there is provided a vehicle antiskid braking system of the split type wherein a hydraulic pressure control source is adapted, upon actuation to supply at least two independent braking circuits with two separate hydraulic braking pressures respectively characterized by comprising an antiskid control unit located in the first braking circuit and adapted to modulate the first braking pressure from said control source to the hydraulic brake actuators of a first set of wheels relating to at least one vehicle axle as a function of the skidding of at least one wheel of said first set, at least one modulator unit located in the second braking circuit and adapted to modulate the second braking pressure from said control source to the hydraulic brake actuators of a second set of wheels relating to at least one of the other vehicle axles as a function of the braking pressure in said first set of wheel brake actuators and, at least one normally closed by-pass valve unit located in parallel fluid flow relationship with said modulator unit and controlled as a function of the pressure differential between said separate braking pressures from said control source, to by-pass said modulator unit for directly connecting said control source to said second set of wheel brake actuators, upon a failure in said first braking circuit.

With such an arrangement it will be understood that, in normal operation, the two separate braking pressures to the first and the second set of wheel brake actuators are simultaneously controlled by the antiskid control unit and that in the event of a failure in any of the independent portions of the braking system the other braking system portion remains operative.

Other features and advantages of the invention will appear from the following description taken in connection with the accompanying drawing in which the single FIGURE is a diagrammatic view of a vehicle braking system according to the invention.

When considering the single FIGURE of the drawing, there is shown a hydraulic split braking system mainly comprising a hydraulic pressure control source, such as a tandem master cylinder 10, operative, upon actuation of an input control push rod 12, to control two separate substantially equal hydraulic braking pressures controlling actuation of the two independent braking circuits generally designated as at 14 and 16 respectively. The first braking pressure in circuit 14 is operative to control actuation of the brake cylinders 18 of a set of wheels 20 relating to at least one of the vehicle axles, such as the front vehicle axle (not shown) through a suitable antiskid control unit 22 responsive to the skidding of at least one of the wheels 20. The antiskid unit 22 is of any known conventional design adapted to modulate the hydraulic braking pressure to actuators 18 as a function of an input control signal generated by a sensor 24 responsive to the angular velocity and/or deceleration of wheel 20.

The second braking pressure in circuit 16 is normally operative to control actuation of the brake cylinders 26 of a set of wheels 28 relating to at least one of the other vehicle axles, through a modulator unit 30. The modulator 30 may be of any known suitable type adapted to modulate the second braking pressure to actuators 26 as a function of the modulated pressure to actuators 18 as controlled by antiskid unit 22. In the shown embodiment, modulator 30 mainly comprises a non-return valve 40 located between an input chamber 32 connected to master cylinder 10 and an output chamber 34 connected to actuators 26, and a valve actuating piston 36 sealingly slidable in chamber 34 to divide same into a control chamber 38 connected to the output of the unit 22. With such an arrangement, it will be understood that in normal operating conditions, the piston 36 is adapted to substantially equalize the hydraulic pressures in chambers 34 and 38. In the event the first braking pressure to actuators 18 becomes lower than the second braking pressure to actuators 26, piston 36 is moved upwardly, as seen in the drawing, so as to terminate the communication between chambers 32 and 34 through valve 40 and thereafter to increase the internal volume of chamber 34 for thereby decreasing the hydraulic braking pressure therein. In the event, the first braking pressure to actuators 18 becomes higher than the second braking pressure to actuators 26, piston 36 is moved downwardly, as seen in the FIGURE, so as to decrease the internal volume of chamber 34 for thereby increasing the hydraulic braking pressure therein and thereafter to urge valve 40 toward its open position for directly connecting the master cylinder 10 to the actuators 26.

With a view to preventing valve 40 to terminate the connection between master cylinder 10 and actuators 26 in the event of a failure in the first braking circuit 14, due to the resulting upward displacement of piston 36, there is provided a by-pass valve unit 42 operatively located in circuit 16 in parallel fluid flow relationship with modulator 30 and adapted to directly connect the master cylinder 10 to actuators 26 in the event the braking pressure from master cylinder 10 to the portion of circuit 14 upstream from the antiskid unit 22 becomes lower than the braking pressure from master cylinder 10 to the portion of circuit 16 upstream from modulator 30.

In the shown embodiment, the by-pass unit 42 mainly comprises a normally closed non-return valve 44 located between an inlet chamber 46 connected to master cylinder 10 and an outlet chamber 48 connected to actuators 26 and a movable valve actuating piston element 50 responsive to the pressure differential between the separate braking pressures from master cylinder 10. For obvious reasons, piston 50 has to be loaded by any known light force producing means adapted to maintain same in a rest position wherein valve 44 is normally maintained in its closed position, when the separate braking pressures from tandem master cylinder 10 are substantially equal. In the shown embodiment, these force producing means consist in providing piston 50 with a substantially differential design, with the effective piston area thereof subjected to the braking pressure in circuit 14 being substantially larger than the effective piston area subjected to the braking pressure in circuit 16. Upon a failure in the braking circuit 14, it will be understood that piston 50 is moved downwardly, as seen in the drawing, to urge valve 44 toward its open position for there-by directly connecting master cylinder 10 to actuators 26, since in that case, the valve 40 of modulator 30 is urged in its closed position.

Advantageously, a suitable braking pressure modifying valve device of any known type as indicated at 52 is located between the output chamber 34 and the brake actuators 26 for modifying the braking pressure thereto as a function for instance of the vehicle load on the axle of wheels 28. The valve device 52 may be either of the pressure limiting type, operative to terminate the connection between actuators 26 and output chamber 34 whenever the braking pressure therein is above a predetermined value, or advantageously of the pressure proportioning type operative to control the braking pressure to actuators 26 in proportion to the braking pressure in chamber 34 after that latter pressure is above a predetermined value, which values, in both cases, may be adjusted as a function of the vehicle axle load on wheels 28 as explained hereinabove.

In the braking system diagrammatically shown in the figure, it is also to be noted that the pressure from antiskid unit 22 is operative to actuate the brake actuators 18' of another set of wheels 20' relating to a given vehicle axle through a braking pressure modifying valve device 19. In the same way, the chamber 34 could, as shown, be connected to another set of wheel brake actuators 26' through a brake pressure modifying valve 52' responsive or not to the load of the vehicle axle of wheels 28'.

I claim:

1. A vehicle antiskid braking system of the split type wherein a hydraulic pressure control source is adapted, upon actuation, to supply at least two independent braking circuits with two separate hydraulic braking pressures respectively characterized by comprising an antiskid control unit located in the first circuit and adapted to modulate the first braking pressure from said control source to the hydraulic brake actuators of a first set of wheels relating to at least one vehicle axle as a function of the skidding of at least one wheel of said first set, at least one modulator unit located in the second braking circuit and adapted to modulate the second braking pressure from said control source to the hydraulic brake actuators of a second set of wheels relating to at least one of the other vehicle axles as a function of the braking pressure in said first set of wheel brake actuators and, at least one normally closed by-pass valve unit located in parallel fluid flow relationship with said modulator unit and controlled as a function of the pressure differential between said separate braking pressures from said control source to by-pass said modulator unit for directly connecting said control source to said second set of wheel brake actuators, upon a failure in said first braking circuit.

2. A vehicle antiskid braking system according to claim 1 characterized in that said modulator unit comprises a housing chamber divided by a slidable valve control plunger into a control chamber operatively connected to said first set of wheel brake actuators and an output chamber operatively connected on the one hand to said second set of wheel brake actuators and on the other hand to said control source through an input one-way valve which is normally actuated toward its open position by said slidable plunger, this latter being adapted, in response to a relative decrease in the first braking pressure in said control chamber with respect to the second braking pressure in said output chamber, to move to terminate the normal communication between said control source and said output chamber and thereafter to increase the internal volume thereof so as to modulate said other braking pressure as a function of said first braking pressure in said control chamber.

3. A vehicle antiskid braking system according to either claim 1 characterized in that said by-pass valve unit comprises a normally closed valve, operatively located between said control source and said second set of wheel brake actuators and a movable valve actuating member responsive to the pressure differential between said separate braking pressures from said control source and adapted to urge said normally closed valve toward its open position in the event of a failure in said one braking circuit.

4. A vehicle antiskid braking system according to claim 1 characterized in that a braking pressure modifying device is provided between said modulator unit and the brake actuators of one of said second set of wheels which relates to a given vehicle axle.

5. A vehicle antiskid braking system according to claim 1 characterized in that a braking pressure modifying valve device is provided between said antiskid unit and the brake actuators of one of said first set of wheels which relates to a given vehicle axle.

6. A vehicle antiskid braking system according to claim 5 characterized in that said braking pressure modifying device is responsive to the vehicle load on said given vehicle axle.

* * * * *